(12) United States Patent
Hellberg

(10) Patent No.: US 8,165,539 B2
(45) Date of Patent: Apr. 24, 2012

(54) APPARATUSES AND A METHOD FOR REDUCING PEAK POWER IN TELECOMMUNICATIONS SYSTEMS

(75) Inventor: Richard Hellberg, Huddinge (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 644 days.

(21) Appl. No.: 12/307,250

(22) PCT Filed: Jul. 3, 2006

(86) PCT No.: PCT/SE2006/050237
§ 371 (c)(1),
(2), (4) Date: Dec. 31, 2008

(87) PCT Pub. No.: WO2008/004923
PCT Pub. Date: Jan. 10, 2008

(65) Prior Publication Data
US 2009/0191827 A1    Jul. 30, 2009

(51) Int. Cl.
*H04B 17/00* (2006.01)
(52) U.S. Cl. .................................... 455/115.3
(58) Field of Classification Search .................. None
See application file for complete search history.

(56) References Cited

U.S. PATENT DOCUMENTS

| | | | | |
|---|---|---|---|---|
| 7,839,949 | B2 * | 11/2010 | Hamada et al. | 375/296 |
| 2002/0197970 | A1 * | 12/2002 | Jian et al. | 455/245.2 |
| 2005/0238110 | A1 | 10/2005 | Yun et al. | |

FOREIGN PATENT DOCUMENTS
WO    WO 2006/068555 A1    6/2006

OTHER PUBLICATIONS

Salvekar A. A. et al.: "Peak-to-Average Power Ratio Reduction for Block Transmission Systems in the Presence of Transmit Filtering"; ICC 2001, IEEE International Conference on Communications, Jun. 2001, pp. 175-178.

(Continued)

*Primary Examiner* — Lincoln Donovan
*Assistant Examiner* — Sibin Chen
(74) *Attorney, Agent, or Firm* — Myers Bigel Sibley & Sajovec, P.A.

(57) ABSTRACT

The present invention relates to an apparatus for reducing peak power in a transmitter for use in telecommunications systems. The invention also relates to a method for reducing peak power in a transmitter for use in telecommunications system and to a base station including such an apparatus. An apparatus according to the invention includes n subsequent interconnected stages (10), where n is larger than or equal to 2; and where each stage (10) of said n stages has an input main signal (1) and an output main signal (2). Each stage of said apparatus further includes an extractor (30) for extracting an overshooting part or peaks (31) of the input main signal (1) based on a predetermined clipping level; a filter (50) having a frequency response, for generating a filtered overshooting part signal (51) wherein the frequency response on at least one reserved frequency of at least one of said n stages (10) is smaller than the frequency response on said at least one reserved frequency of a previous stage and a combiner (70) arranged to generate the output main signal (2) by subtracting the filtered overshooting part signal (51) from a delayed version (61) of the input main signal (1).

24 Claims, 11 Drawing Sheets

OTHER PUBLICATIONS

Krongold B. S. et al.: "An Active-Set Approach for OFDM PAR Reduction via Tone Reservation"; IEEE Transactions on Signal Processing, vol. 52, No. 2, Feb. 2004, pp. 495-509.

Tellado, J. et al.: "Efficient Algorithms for Reducing PAR in Multicarrier Systems"; ISIT, IEEE Aug. 1998, p. 191.

International Preliminary Report on Patentability issued in international application No. PCT/SE2006/050237, dated Oct. 10, 2008, 10 pages.

Office Action with English language summary, JP Application No. 2009-518035, Jan. 27, 2012.

Han et al., "An Overview of Peak-to-Average Power Ratio Reduction Techniques for Multicarrier Transmission" *IEEE Wireless Communications*, vol. 12, No. 2, Apr. 2005, pp. 56-65.

* cited by examiner

APPARATUSES AND A METHOD FOR REDUCING PEAK POWER IN TELECOMMUNICATIONS SYSTEMS

TECHNICAL FIELD

The present invention relates to signal processing in general and to apparatuses and a method for reducing peak power in a transmitter for use in telecommunications systems in particular.

BACKGROUND

In many applications, typically in various communications systems and especially in multi-carrier modulation systems, e.g. Orthogonal Frequency Division Multiplexing (OFDM), there are requests for non-linear modification of a signal because multi-carrier signals suffer from a high peak to average power ratio. In many cases, such non-linear modifications have to be kept within a certain bandwidth or within certain spectral mask restrictions. One typical example of such non-linear modification is Peak-To-Average Ratio (PAR) reduction. PAR reduction increases efficiency and average output power of a peak power limited Power Amplifier (PA). PAR is more pronounced in multi-carrier systems, e.g. OFDM since a large number of orthogonal, narrowband carriers are used, which when added up coherently give a large PAR. A large PAR ratio brings disadvantages like a reduced efficiency of a Radio Frequency (RF) power amplifier and an increased complexity of analogue to digital and digital to analogue converters.

The objective of peak reduction techniques is therefore to reduce the peak amplitude excursions of the output signal while keeping the spectrum expansion within specified limits, such as spectral mask and adjacent channel power ratio (ACPR) specifications, and keeping in-band error within specified limits, so-called error vector magnitude (EVM) specification.

There are many existing prior art solutions dealing with peak power reduction for multi-carrier signals and signal carrier signals.

In the international patent application WO/2006/068555, non-linear modification of an input signal under bandwidth constraint and spectral mask restrictions is described and can be applied in peak to average reduction systems. In this prior art, non-linear signal conditioning is provided by signal processing in a number of steps, wherein for each step an insertion source signal is provided, which is treated non-linearly to fulfil certain restrictions in bandwidth and spectral mask and for keeping in-band error within specified limits, so-called error vector magnitude (EVM) specification.

Another prior art approach for reducing the peak power of an input waveform is to implement power clipping. In the power clipping approach, whenever the amplitude of the input signal is lower than a predetermined threshold, the input signal is passed to the output unchanged, and whenever the amplitude of the input signal exceeds the threshold, the output signal is clamped to the threshold level. Of course, the clipping operation destroys some of the information contained in the original signal. However, the user should be able to tolerate this loss of information as along as the threshold is kept sufficiently high.

Decresting is another prior art approach for reducing the peak power of an input waveform, while avoiding the overshooting problems caused by the baseband filter in the power clipper. In this approach, which is suggested in the international patent application WO 03/001697, an error signal is created that represents the amount by which the input signal exceeds a threshold. This error signal is then subtracted from the original input signal in order to form a decrested output signal.

Tone reservation is another method used to reduce peak power of a signal, typically used when an input signal is a multi-carrier signal or a multi-tone signal. In this method, described in J. Tellado-Mourello, "Peak to Average Reduction For Multicarrier Modulation" Dept. of Electrical Engineering of Standford University, pp. 66-99, September 1999, the peak power is reduced by selecting or reserving a subset of a plurality of frequencies that make up a multi-carrier symbol. These selected or reserved frequencies are used to create an appropriate impulse function, which is scaled, shifted, rotated and subtracted from the input multi-tone signal at each peak of the input signal that exceeds a predetermined threshold. Thus, one or several peaks may be clipped in this fashion and in one iteration. However, reducing one or more peaks may cause the resulting waveform to exceed the clipping threshold at other positions. Therefore, the process is repeated until a satisfactory peak-to-average reduction is achieved. The impulse function created from the subset of reserved frequencies are usually pre-computed since the subset of reserved frequencies is usually known in advance.

The basic idea of reducing the peak power using a pre-computed impulse function created from reserved frequencies of the multi-carrier signal is attractive and does really reduce the peak power, but for large numbers of carriers or tones, i.e. large number of samples per multi-carrier symbol, and aggressive peak reduction. i.e. peak reduction at low output peak-to-average ratio, the number of peaks gets large. This means that the number of iterations needed to reduce the peak power to a satisfactory level also gets large. This increases the complexity of the implementation and therefore also hardware and power consumption of a transmitter.

SUMMARY

None of the above mentioned prior art peak power reduction methods achieve high performance with relatively small and simple configurations as the number of carriers of a signal gets large and as aggressive peak reduction is used.

An object of the invention is thus to provide a method and apparatuses for reducing peak power in a transmitter for use in telecommunications systems such that improved performance of tone reservation is achieved especially when the number of carriers gets large and when aggressive peak reduction is used.

According to a first aspect of the invention, the above stated problem is solved by means of an apparatus for reducing peak power in a transmitter for use in telecommunications systems. The apparatus according to the invention comprises at least two subsequent interconnected stages. Each stage has an input main signal and an output main signal and comprises an extractor for extracting an overshooting part or peaks of said input main signal based on a predetermined clipping level. Each stage of said apparatus further comprises a filter having a frequency response, for generating a filtered overshooting part signal wherein the frequency response on at least one reserved frequency of at least one of said stage is smaller than the frequency response on said at least one reserved frequency of a previous stage. Each stage also comprises a combiner arranged to generate said output main signal by subtracting said filtered overshooting part signal from a delayed version of said input main signal.

According to a second aspect of the invention, the above stated problem is solved by means of a method for reducing peak power in a transmitter for use in telecommunications systems comprising at least two subsequent interconnected stages. The method comprises for each stage the steps of: providing an input main signal; extracting an overshooting part or peaks of said input main signal exceeding a predetermined clipping level; generating a filtered overshooting part signal using a filter having a frequency response, wherein the frequency response on at least one reserved frequency of at least one of said stages is smaller than the frequency response on said at least one reserved frequency of a previous stage; and generating an output main signal from said stage using a combiner configured to subtract said filtered overshooting part signal from a delayed version of said input main signal.

According to a third aspect of the invention, the above stated problem is solved by means of a base station, which base station comprises an apparatus that reduces peak power in a transmitter for use in telecommunications systems.

An advantage with the present invention is that an improved performance of tone reservation is achieved, especially for large number of carriers and aggressive peak reduction.

Another advantage with the present invention is that hardware and power consumption of a base station are reduced.

Yet another advantage is that the apparatus according to the present invention is fairly simple to implement.

Another advantage with the present invention is that the processing is regular and straightforvard and needs only few adjustable parameters.

The present invention will now be described in more details by means of preferred embodiments and with reference to the accompanying drawings.

DETAILED DESCRIPTION

To achieve good performance, for instance low peak-to-average in decresting while meeting EVM and ACPR specifications, generally calls for more stages of non-linear modification and subsequent filtering of the input signal. If good performance is still to be achieved when non-linear modification and subsequent filtering is applied on multi-carrier input signals, an improved filtering is needed.

Figure 1A:
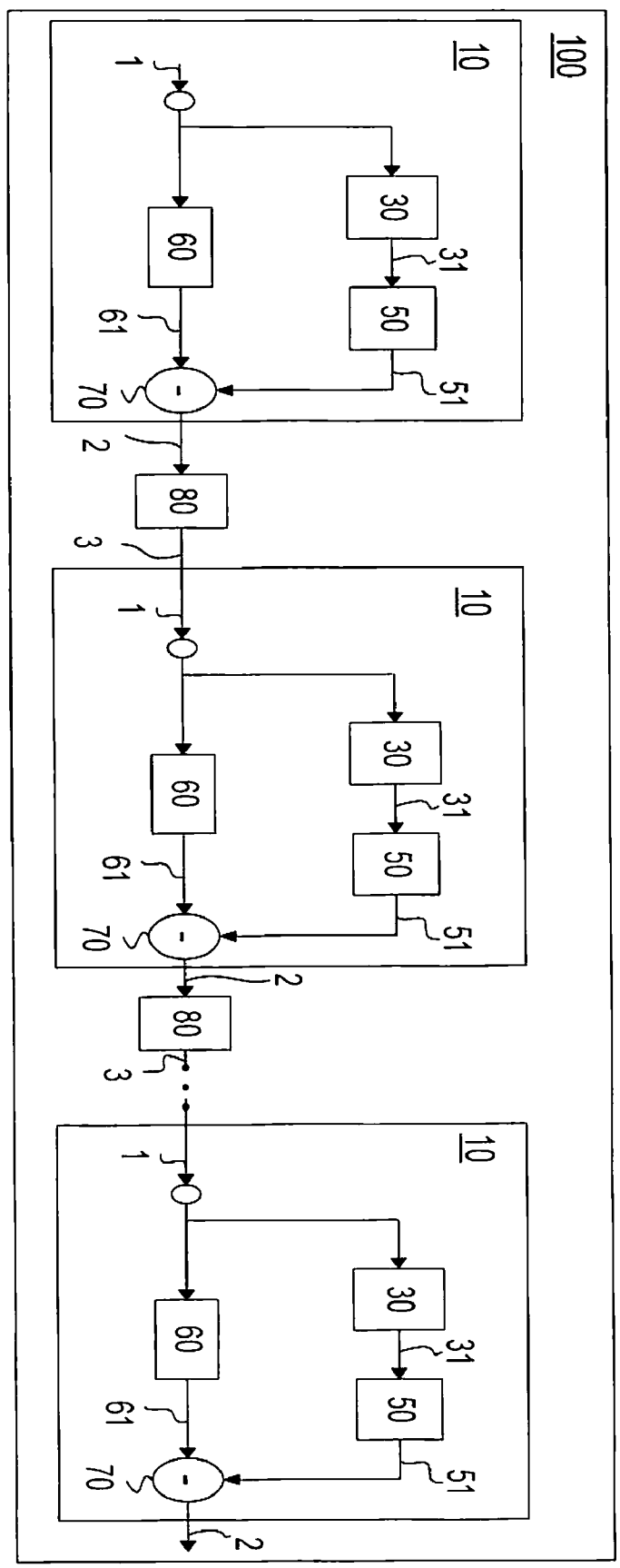
FIG. 1a is a schematic block diagram of a first embodiment of an apparatus for reducing peak power according to the present invention.

The present invention relates to an apparatus 100 as illustrated in FIG. 1a, for reducing peak power in a transmitter, wherein the actual non-linear modification and processing takes place in a series of n successive stages 10, where n is larger than or equal than 2. Each stage 10 performs nonlinear signal processing of an input main signal 1 and produces a modified output main signal 2. A subsequent stage 10 has thus the output signal of a preceding stage delayed as input signal.

According to the present invention, high performance is achieved through an improved filtering scheme performed in each stage 10, wherein an overshooting part or peaks of the input main signal 1 of one stage 10 is passed through a filter 50, having a frequency response, wherein the frequency response on at least one reserved frequency of one stage 10 is smaller that the frequency response on the same reserved frequency/frequencies of a previous stage. The output from the filter is further passed through a combiner 70 to generate an output signal 2 from a single stage 10. The combiner is arranged to subtract the output from the filter from a delayed version of the input signal. The input signal of each stage is delayed because the processing of the input signal takes some time. As mentioned above, the processing includes the extraction of an overshooting part or peaks of the input signal and the filtering of the overshooting part.

The filter 50 according to embodiments of the present invention consists of a first reinsertion factor which is applied on at least one reserved frequency of one stage, and a second reinsertion factor which is applied on at least one non-reserved frequency of the stage.

In accordance with the embodiments of the present invention, the first reinsertion factor decreases for at least one subsequent stage, and in particular embodiments, for each subsequent stage. In addition, and in accordance with some embodiments of the present invention, the second reinsertion factor increases for at least one subsequent stage, and in particular embodiments for each subsequent stage.

As previously mentioned, the first reinsertion factor dedicated to at least one reserved frequency can for example be exponentially decreasing with stage number, linearly decreasing, or decreasing by some other scheme. Also, the second reinsertion factor dedicated to at least one non-reserved frequency can for example be exponentially increasing with stage number, linearly increasing or increasing by some other scheme.

The embodiments of the invention will now be described based on an input multi-carrier signal having reserved frequencies. Although, the present invention may also be used for a single carrier signal aimed to be transmitted through a communication channel having pronounced zero position/positions in which reserved frequency/frequencies may be allocated.

Thus, the present invention is applicable in any type of communications systems utilizing multiple carries or the above-described single carriers. By way of example, the invention applies to Orthogonal Frequency Division Multiplexing (OFDM), discrete Multi-Tone (DMT), Asymmetrical Digital Subscriber Line (ADSL), Digital Audio Broadcasting, Discrete Wavelet Multi-Tone (DWMT) or Digital Video Broadcasting (DVB) communications systems.

In order to achieve the desired results in reducing the peak power in a transmitter using the apparatus 100 of FIG. 1 in accordance with the present invention, it is of great importance to define the parameters that are used to describe the performance of frequency reservation schemes, also referred to as tone reservation schemes in accordance with the present invention:

The parameters are:

1) The percentage of tones or frequencies that are used for peak power reduction relative the number of overall frequencies. A greater number of reserved tones or frequencies provides better performance. However, as the number of reserved tones increases, more bandwidth is lost to peak power reduction signals. Thus, a trade-off must be made between performance and bandwidth.

The reserved tone/tones or frequency/frequencies may be chosen by any suitable method. As an example, frequencies that are noisy may be utilized as peak power reductions tones since the decrease in data rate of the output symbol is minimised. The frequencies or tones may also be randomly selected. Alternatively, the tones may be chosen based upon the characteristics of the channel.

According to the embodiments of the present invention, reserved frequency/frequencies is/are chosen prior to transmission. This is done to avoid transmitting any side information to a receiver in those embodiments no special receiver operation is needed.

In alternate embodiments reserved frequency/frequencies may be reselected during communication depending on the quality of the channel or for any other reason. In this case, the receiver is informed on or originates the reserved frequency/frequencies.

Furthermore and in accordance with embodiments of the present invention, the reserved frequencies/frequency typically do/does not carry any useful information. Instead, the non-reserved frequencies/frequency are/is allowed to carry useful information. In alternate embodiments. the reserved frequencies/frequency may include some type of information. In those embodiments, the reserved frequencies/frequency are/is also decoded by the receiver.

In addition to the percentage of tones or frequencies that are used, the distribution of the tones is also important. In practical designs, generally random distributions of the reserved tones perform much better than an evenly spaced tones or tones clustered. According to the present invention, a random distribution of the reserved tones or frequencies is used. However, any suitable distribution could be used.

2) The Peak-to-Average ratio Reduction (PAR), where the average should be specified to whether it, in addition to the power of the non-reserved tones/frequencies, contains also the power of the reserved tones/frequencies or not.

3) The power in the reserved tones or frequencies relative the power in the non-reserved tones or frequencies.

4) The error in the non-reserved tones, usually specified, as mentioned earlier, in the form of the error vector magnitude (EVM) percentage. The choice of the EVM percentage is system specific and usually depends on the desired data rate to be used in the system.

According to exemplary embodiments of the present invention, the peak power may be defined as the point above which −60 dBc (c for carrier) of power exists for the total signal, i.e. all tones; and the average power is defined as the sum of the power in the non-reserved tones only. However, any other suitable definition of the peak power may be used, and the present invention is therefore not restricted to any specific definition of the peak power.

Figure 1B:
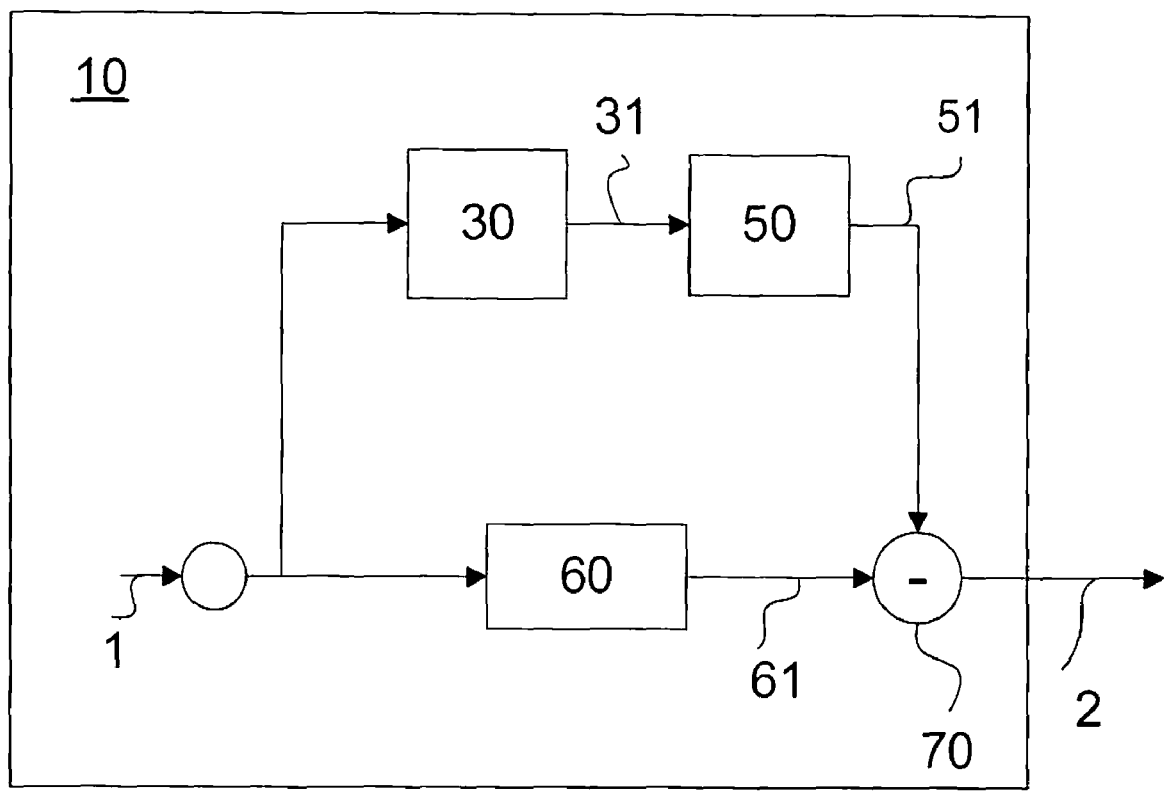
FIG. 1b is a schematic block diagram of a first embodiment of one stage in an apparatus for reducing peak power according to the present invention.

Referring back to FIG. 1a, an apparatus 100 for reducing peak power in a transmitter according to embodiments of the present invention is illustrated. The actual non-linear signal processing takes place in a series of n successive stages 10, where n is larger than or equal to 2. Each stage 10 performs a non-linear signal processing of an input main signal 1 and produces a modified output main signal 2. A subsequent stage 10 has thus the output signal of a preceding stage delayed as input signal. The stages 10 may be similar or identical in configuration, but this is not entirely necessary. For ease of viewing, a single stage 10 is illustrated in FIG. 1b.

According to a first embodiment of the present embodiment, an input main signal 1 of a stage 10 is connected to a peak extractor 30 that extracts an overshooting part or peaks 31 of the input main signal 1 based on a predetermined clipping level T. The clipping level is also called "offset level", "threshold level", "limit level" or "clip threshold". The process of peak extraction can be performed in a number of different ways. The peak of the input main signal is defined as the difference between the input main signal 1 and the amplitude limited input signal. The overshooting part or peaks of the input signal 1 can be determined by subtracting the clipping level T from an amplitude A, obtained by a rectangular to polar conversion unit. The positive, i.e. the rectified part, of this difference is used, together with the original phase of the input main signal 1, as inputs to a polar to rectangular conversion unit. The output of this polar to rectangular conversion unit is the extracted peaks in the same format as the input signal.

Another peak extraction method that could be used takes the squared magnitude of the complex sample of the input main signal by adding the squared real and imaginary components of the input main signal, uses the result to address a Look-Up Table (LUT) to obtain a real factor that is used to multiply the complex sample by to obtain the peaks of the input main signal.

It should be note that any other method of extracting peaks of a signal may be used.

According to embodiments of the present invention, the overshooting part or peaks 31 of the input main signal 1 is subsequently passed through a filter 50. The filter 50 is for each stage 10 characterized by having one first reinsertion factor $k_n$ for the tone reservation part, denoted here by TR part, at the frequency locations/location of the reserved tones/tone; and one second reservation factor $j_n$ for the non-tone reservation part, denoted here by EVM part at the frequency locations/location of the non-reserved tones/tone.

It should be noted that in case the fourth parameter described above, i.e. the EVM percentage, is chosen to be equal to zero, the second reinsertion factor $j_n$ is also set to zero, since no error is to be placed in the non-tone reservation part.

According to embodiments of the present invention, the first reinsertion factor $k_n$ for the TR part is smaller than the reinsertion factor $k_{n-1}$ of a previous stage; and simultaneously, the second reinsertion factor $j_n$ for the EVM part (if any) is larger than the reinsertion factor of a previous stage $j_{n-1}$. An example collection of reinsertion factors for the TR part for an eight-stage system can e.g. be $k_1=8$, $k_2=6.8$, $k_3=6$, $k_4=5.3$, $k_5=4.5$, $k_6=4$, $k_7=3.7$, $k_8=3$, whereas, an example collection of the reinsertion factors for the EVM part for the same eight-stage system are e.g. $j_1=0.4$, $j_2=0.45$, $j_3=0.52$, $j_4=0.61$, $j_5=0.7$, $j_6=0.83$, $j_7=0.93$, $j_8=1.1$.

The above collections of reinsertion factors are deduced from the result presented in FIG. 3b, and will be discussed later.

The number of stages and the sizes of reinsertion factors depend on the choice of the above mentioned four parameters; the bandwidth of the signals and filters; the required accuracy of the output and other factors whose combinations are too numerous to list here. They must typically be elaborated for the problem at hand or by computer simulations. However, such elaboration falls within the knowledge of persons skilled in the art.

Thus, according to embodiments of the present invention, the reinsertion factor $k_n$ used for the reserved tone portion, i.e. the TR part has a different and decreasing evolution which its exhibits through the stages 10 than the reinsertion factor $j_n$ used for the non-tone reservation part, i.e. the EVM pan (if any) which has a different and increasing evolution that exhibits through the stages 10. In other words, filter 50 has a frequency response, for generating a filtered overshooting part signal 51, wherein the frequency response on the TR part of one stage 10 is smaller than the frequency response on the TR part of a previous stage, and simultaneously, the frequency response on the EVM part (if any) of one stage is larger than the frequency response on the EVM part of a previous stage.

A combination of the two reinsertion factors has, as will be described later, a great effect of the convergence of the signal modification leading to an improved reduction in peak power of apparatus 100. Generally, higher reinsertion factors $k_n$ for the TR part places more error in the reserved tones/tone or frequencies/frequency and higher reinsertion factors $j_n$ for the EVM part places more error in the non-reserved tones/tone or frequencies/frequency.

According to the embodiments of the present invention, the reinsertion factor $k_n$ used for the TR part can for example be exponentially decreasing with stage number, or linearly decreasing with stage number. Other developments are also possible, such as parabolic decreasing reinsertion factors or monotonously decreasing factors. Thus, the evolution of the reinsertion factor $k_n$ according to the present invention is not restricted to the above mentioned developments.

Similarly and according to the embodiments of the present invention, the reinsertion factor $j_n$ used for the EVM part (if any) can for example be exponentially increasing with stage number, or linearly increasing with stage number. Also here, other developments are possible, such as parabolic increasing reinsertion factors or monotonously increasing factors. Thus, the evolution of the reinsertion factor $j_n$ used for the EVM part according to the present invention is not restricted to the above mentioned developments.

Referring back to FIG. 1a, as the overshooting part or peaks 31 of the input main signal 1 is passed through the filter 50 which is characterized by the reinsertion factors $k_n$ and $j_n$, a filtered overshooting part signal 51 is generated and further combined with a delayed version of the input main signal 61 to produce an output main signal 2. The combination is performed by subtracting the filtering overshooting signal 51 from the delayed signal 61. As mentioned earlier, the reason why a delayed version 61 of the main signal 1 is used is that the processing of the main signal 1 in the peak extractor 30, and the processing of the extracted signal 31 in the filter means 50 takes some time. Typically, the main signal 1 therefore needs to be delayed for a corresponding amount of time for giving the intended signal when combined with the filtered overshooting part signal 51. Therefore, a delay unit 60 is in the embodiments of the present invention inserted between the input generating the main signal 1 and the combiner 70 to compensate for such delay or similarly for synchronising the input main signal 1 with the filtered overshooting part signal 51.

As illustrated in FIG. 1a and in accordance with embodiments of the present invention, stages 10 are separated by means 80, which is actually a fractional delay filter. This fractional delay filter is provided dependent on the sampling rate used in the system. The fractional delay filter 80 is configured to delay the output main signal 2 by a fraction sample of a sample in or between each stage, so that the signal samples used in a later stage are placed in between the sample instants used in a previous stage. The fraction sample delays are preferably chosen differently for different systems depending on bandwidths, number of non-linear processing stages and other varying factors. The idea of using a fractional delay filter 80 is to lower the number of operations per sample. An advantage of using the fractional delay filter 80 is therefore to reduce even more hardware requirements, and power consumption in combination with described stage 10 of apparatus 100 according to embodiments of the present invention.

As illustrated in FIG. 1a, the output from the fractional delay filter 80 is further used as main input signal 1 of a subsequent stage 10. As mentioned earlier, the number of stages 10 and the number of reinsertion factors needed to achieve a desired reduction in the peak power depend on the choice of the above mentioned four parameters; the bandwidth of the signals and filters; the required accuracy of the output and other factors.

Figure 3A:
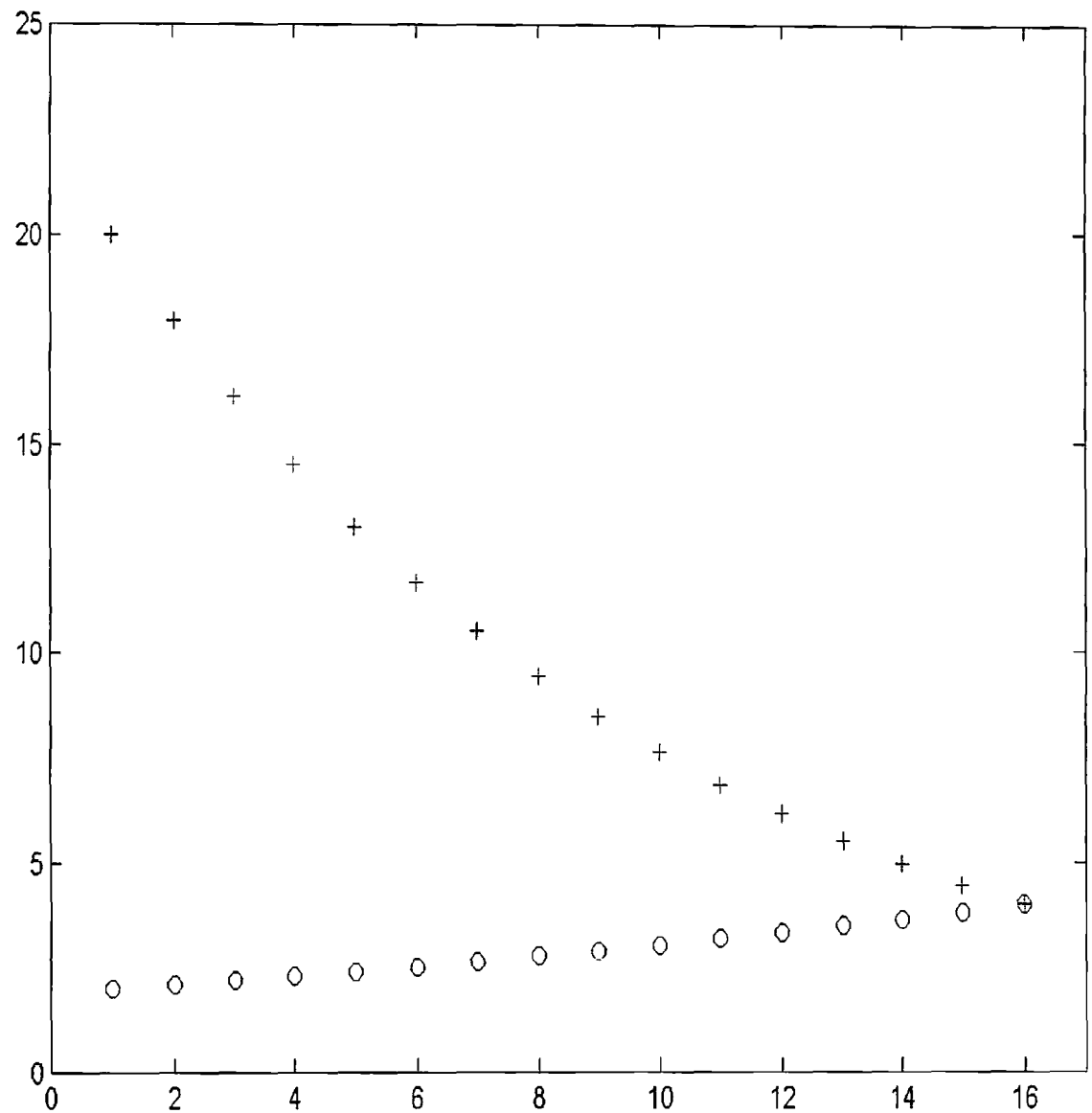
FIG. 3a is a diagram illustrating the reinsertion factors in each stage of an apparatus having 16 stages used to reduce peak power according to an exemplary embodiment of the present invention.

As an example, 16 stages 10 at an Over-Sampling-Ratio (OSR) of one, with 16 fractional delay filters 80 between stages 10 having respective values [½, –¼, –½, ⅜, ½, –¼, –½, 9/16, –½, ¼, –½, ⅝, –½, ¼, ½, and –9/16] are needed to achieve 6.2 dB Peak-to-Average ratio Reduction (PAR) with 5% reserved frequencies using a random distribution; a 5% power overhead in the reserved frequencies and 2% EVM in the non-reserved frequencies. The clipping threshold T used is 6.17 dB relative the average power in the non-reserved frequencies. The collection of reinsertion factors $k_n$ (+) for the TR part and $j_n$ (o) for the EVM part used to achieve a 6.2 dB Peak-to-Average is illustrated in FIG. 3a. As can be deduced from FIG. 3a, exponentially decreasing reinsertion factors $k_n$ (+) from 20 to 4 are used for the TR part and simultaneously, exponentially increasing reinsertion factors $j_n$ (o) from 0.2 to 0.4 are used for the EVM part. The reinsertion factors for the EVM part (o) have been magnified by a factor of 10 for ease of viewing.

Figure 2A:
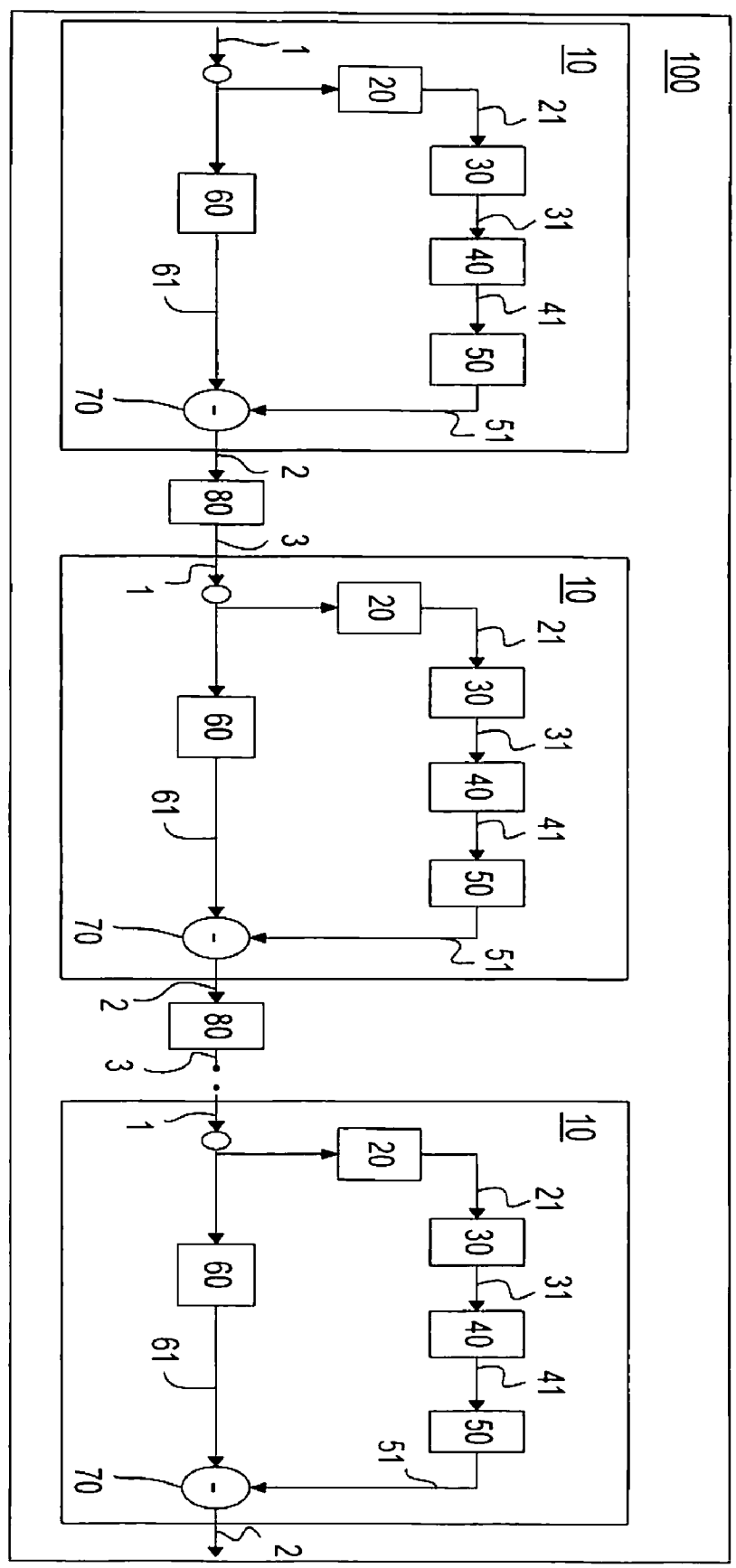
FIG. 2a is a schematic block diagram of a second embodiment of an apparatus for reducing peak power according to the present invention.
Figure 2B:
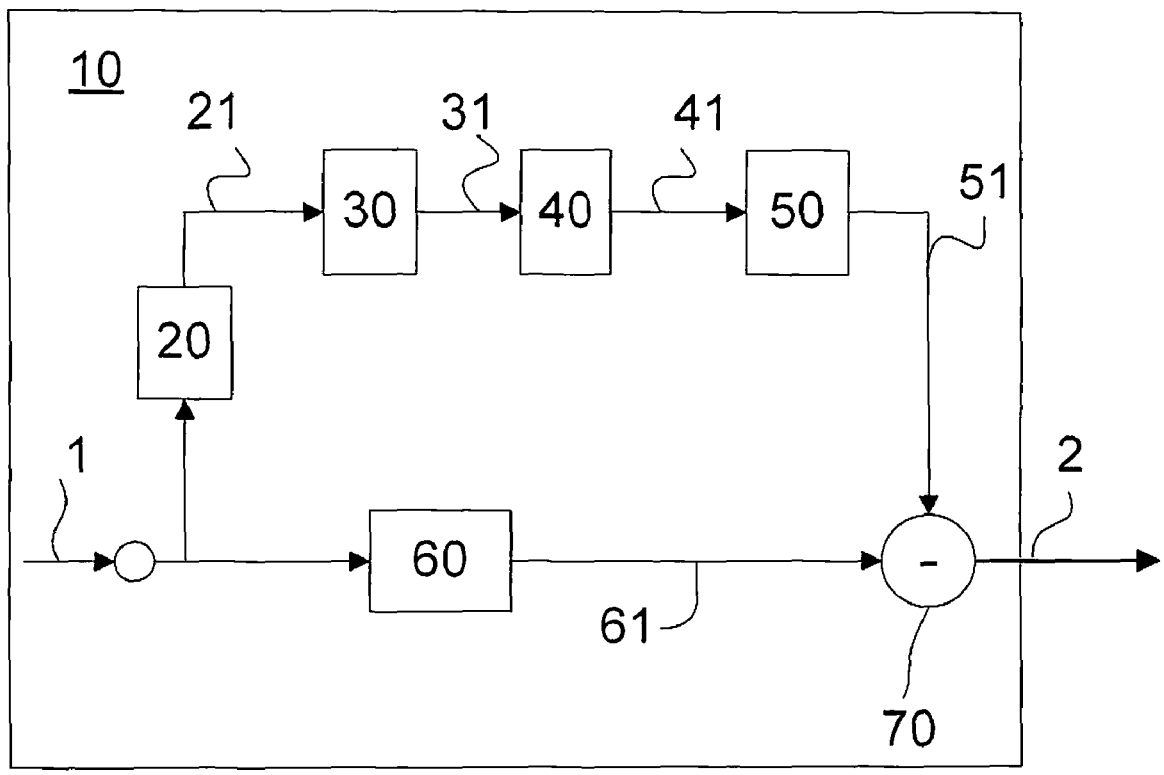
FIG. 2b is a schematic block diagram of a second embodiment of one stage in an apparatus for reducing peak power according to the present invention.

FIG. 2a illustrates a schematic block diagram of a second embodiment of an apparatus 100 for reducing peak power according to the present invention. Similarly to apparatus 100 of FIG. 1a, the actual non-linear signal processing takes place in a series of n successive stages 10, where n is larger than or equal to 2. Each stage 10 performs a non-linear signal processing of an input main signal 1 and produces a modified output main signal 2. A subsequent stage 10 has thus the output signal of a preceding stage delayed as input signal. The stages 10 may be similar or identical in configuration, but this is not entirely necessary. For ease of viewing, a single stage 10 is illustrated in FIG. 2b.

This second embodiment of the present invention differs from the first one in that the main signal 1 presently used as input to each stage 10 is in a frequency domain. According to the present embodiment, each stage 10 applies an Inverse Fast Fourier Transform on the input main signal 1 in order to obtain time domain samples of that signal 21. IFFT Means 20 is responsible for the signal conversion. Time domain samples 21 are further passed through a peak extractor 30, that extracts an overshooting part or peaks 31 of the samples of signal 21 based on a predetermined clipping threshold. The function of peak extractor 30 is similar to both embodiments of the present invention.

According to the second embodiment, a Fast Fourier Transform operation using FFT means 40 is applied on the overshooting part signal 31 in order to obtain frequency samples 41 of the overshooting part signal 31. According to the second embodiment, frequency domain samples (complex) of the overshooting part signal 41 are further multiplied by a filter or frequency mask (real) 50 wherein for each stage 10 of apparatus 100 consists of the reinsertion factor $k_n$ for the TR part at the frequency locations of the reserved frequencies or tones, and the reinsertion factor $j_n$ for the EVM part (if any) at the frequency locations of the non-reserved frequencies or tones.

The samples of output signal 51 from the filter or frequency mask 50 are further subtracted from delayed version 61 of the frequency domain input samples 1 of the main input signal 1 using combiner 70. Similarly to the first embodiment, the output signal from combiner 70 corresponds to the output signal 2 from a single stage 10. Further, frequency domain samples of the output signal 2 are passed through means 80 to obtain a fractional delay signal 3, which is further used as input main signal 1 to a subsequent stage 10. An advantage of having the signal between stages 10 in a frequency domain is that a fractional delay signal 3 is easily obtained by simply multiplying frequency domain samples of the output signal from stage 10 by a complex exponential.

Equivalently to the first embodiment, the reinsertion factor $k_n$ for the TR part of the frequency mask or filter 50 has a different and decreasing evolution through stages 10, whereas the reinsertion factor $j_n$ for the EVM part (if any) of the frequency mask or filter 50 has a different and increasing evolution through stages 10.

Thus, in both embodiments of the present invention, the frequency mask or filter 50 varies with stage number. In other words, frequency mask or filter 50 has en frequency response, for generating a filtered overshooting part signal 51, wherein the frequency response on the TR part of one stage 10 is smaller than the frequency response on the TR part of a previous stage, and simultaneously, the frequency response on the EVM part (if any) of one stage is larger than the frequency response on the EVM part of a previous stage.

It should be noted that FFT means 40 could be used even if the input main signal (1) is originally in a time domain. In such case, IFFT means 20 could be placed after the frequency mask or filter (50) in order to convert the filtered part signal (51) into time domain prior to combining it with the delayed version (61) of the input main signal (1).

Furthermore, in case the input main signal (1) is in a frequency domain, IFFT means (20) could instead be placed before the filter (50) and FFT means be placed after the filter (50). Other permutations are also possible, and therefore, the present invention is neither restricted to the above described combinations nor to the number of FFT and IFFT means used.

In the following, some exemplary embodiments in accordance with the present invention illustrating the evolution of the reinsertion factors $k_n$, $j_n$, are presented.

FIG. 3a illustrates an example using 16 stages at an OSR of one, with 16 fractional delay filters 80 between stages 10 having respective sample values: [½, −¼, −½, ⅜, ½, −¼, −½, 9/16, −½, ¼, −½, ⅝, −½, ¼, ½, and −9/16]. A fractional delay after the last stage 10 is presently used to bring the sample timing back to zero. This is however optional.

The input main signal 1 used as input to stage 10 is here considered to be an OFDM multi-carrier signal having 2048 samples. The parameters used in this exemplary embodiment are:
  a clipping threshold T of 6.17 dB relative the average power in the non-reserved frequencies;
  a 5% reserved frequencies or tones (with a random distribution) for the TR part;
  a 5% power overhead in the reserved tones;
  a 2% EVM in the non-reserved tones.

As discussed above, a fractional delay signal 3 is easily obtained by simply multiplying frequency domain samples of the output signal 2 from stage 10 by a complex exponential. For the first stage 10 of this example, the frequency domain samples of the output signal 2 is multiplied by:

$$\exp(-j*2*pi.*[\text{frequency sample number}]*[½]./N),$$

where N is the number of samples in the OFDM block, which in this case is 2048 samples. Subsequently, for the second stage 10 of this example, the frequency domain samples of the output signal 2 is multiplied by $$\exp(-j*2*pi.*[\text{frequency sample number}]*[-¼]./N),$$
and so on.

Now, to achieve 6.2 dB PAR, exponentially decreasing reinsertion factors $k_n$ (+) from 20 to 4 are used for the TR part and simultaneously, exponentially increasing reinsertion factors $j_n$ (o) from 0.2 to 0.4 are used for the EVM part as illustrated in FIG. 3a. The reinsertion factors for the EVM part (o) have been magnified by a factor of 10 for ease of viewing.

Another example uses 16 stages at an OSR of one; an OFDM multi-carrier signal having 2048 samples used as main input signal 1; and 16 fractional delay means 80 between stages 10 having the same respective sample values as the preceding example, i.e. [½, −¼, −½, ⅜, ½, −¼, −½, 9/16, −½, ¼, −½, ⅝, −½, ¼, ½, and −9/16] achieves the following:

To achieve 6.7 dB PAR, the following parameters have been used:
  a clipping threshold T of 6.67 dB relative the average power in the non-reserved frequencies;
  a 5% reserved frequencies or tones (with a random distribution) for the TR part;
  a 7.5% power overhead in the reserved tones;
  a 0% EVM in the non-reserved tones, i.e no error placed in the EVM part.

Exponentially decreasing reinsertion factors $k_n$ from 34 to 16 are obtained and are used in the 16 stages.

Yet another example uses 16 stages at an OSR of one; an OFDM multi-carrier signal having 2048 samples used as main input signal 1; and 16 fractional delay means 80 between stages 10 having the same respective sample values as the preceding examples, i.e. [½, −¼, −½, ⅜, ½, −¼, −½, 9/16, −½, ¼, −½, ⅝, −½, ¼, ½, and −9/16] reaches the following:

To achieve 6.0 dB PAR, the following parameters have been used:
  a clipping threshold T of 5.97 dB relative the average power in the non-reserved frequencies;
  a 10% reserved frequencies or tones (with a random distribution) for the TR part;
  a 10% power overhead in the reserved tones;
  a 0% EVM in the non-reserved tones, i.e no error placed in the EVM part.

Exponentially decreasing reinsertion factors $k_n$ from 21 to 7 are obtained and are used in the 16 stages.

Figure 3B:
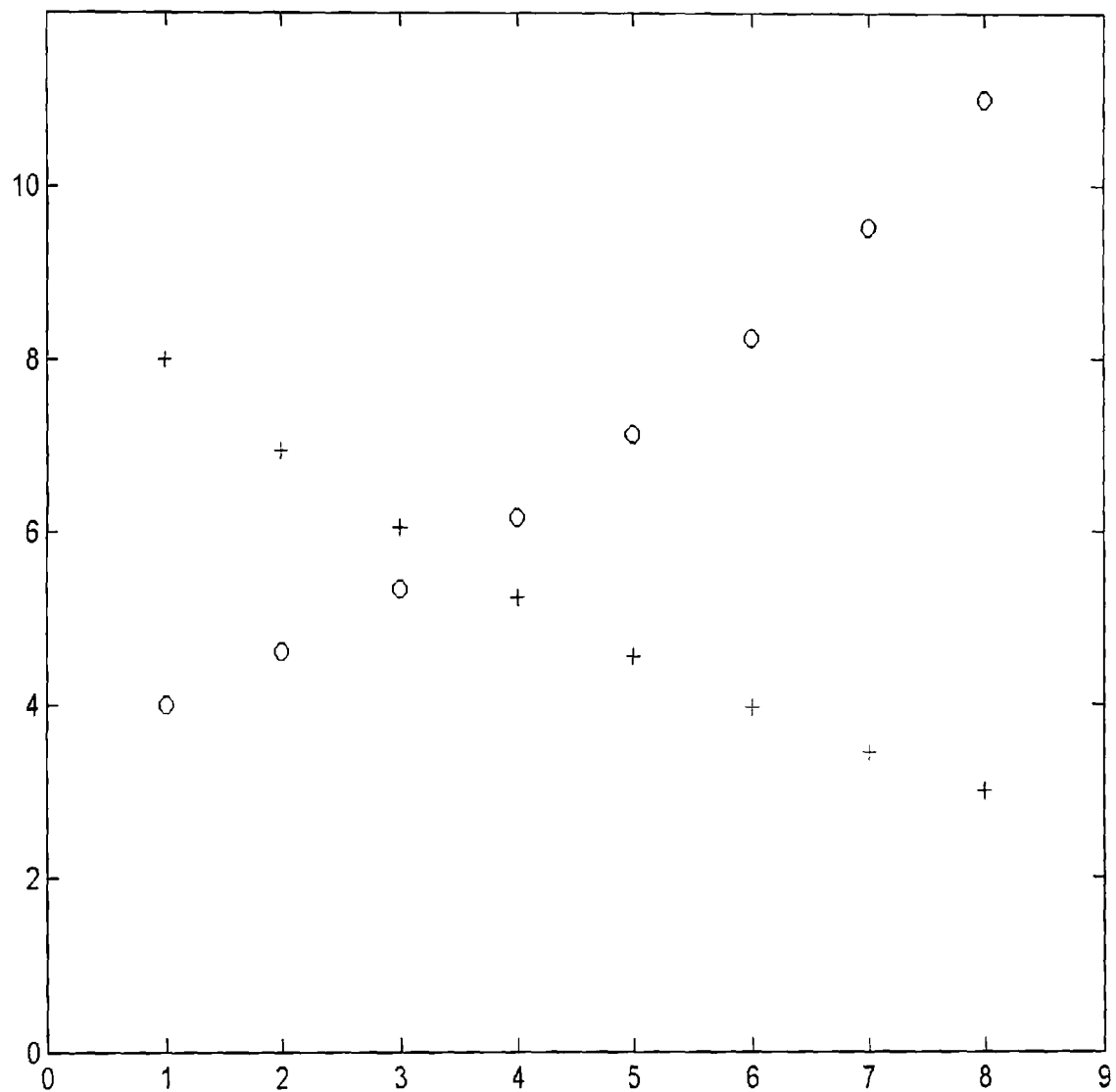
FIG. 3b is a diagram illustrating the reinsertion factors in each stage of an apparatus having 8 stages used to reduce peak power according to an exemplary embodiment of the present invention.

FIG. 3b illustrates another diagram in accordance with the second embodiment of the present invention, illustrating collections of reinsertion factors $k_n$ (+), and $j_n$ (o) and their evolution.

According to this exemplary embodiment 8 stages at an OSR of one are used, with 8 fractional delay filters 80 between stages 10 having respective sample values [½ −¼ −½ ⅜, ½ −¼ −½ ⅛]; and an input main signal 1 being an OFDM multi-carrier signal having 2048 samples. In order to achieve a 4 dB PAR, the following parameters are used:
  a clipping threshold T of 3.85 dB relative the average power in the non-reserved frequencies;
  a 5% reserved frequencies or tones (with a random distribution) for the TR part;
  a 5% power overhead in the reserved tones;
  a 13% EVM in the non-reserved tones.

Similarly to the preceding example, the frequency domain samples of the output signal 2 is multiplied by exp(−j*2*pi.*[frequency sample number]*[½]./N).

where N is equal to 2048 samples. Subsequently, for the second stage 10 of this exemplary embodiment, the frequency domain samples of the output signal 2 is multiplied by exp(−j*2*pi.*[frequency sample number]*[−¼]./N), etc. . . .

Now, to achieve 4 dB PAR, exponentially decreasing reinsertion factors $k_n$ (+) from 8 to 3 are used for the TR part and simultaneously, exponentially increasing reinsertion factors $j_n$ (o) from 0.4 to 1.1 are used for the EVM part as illustrated in FIG. 3b. The reinsertion factors for the EVM part (o) have been magnified by a factor of 10 for ease of viewing.

Another exemplary embodiment, which is not illustrated in any figure, uses the same number of stages, i.e. 8 stages at an OSR of 1 to achieve 6.3 dB PAR with the following parameters:
  a clipping threshold T of 6.17 dB relative the average power in the non-reserved frequencies;
  a 5% reserved frequencies or tones (with a random distribution) for the TR part;
  a 5% power overhead in the reserved tones;
  a 2% EVM in the non-reserved tones.

In this example, exponentially decreasing reinsertion factors $k_n$ (+) from 20 to 5 are used for the TR part and simultaneously, exponentially increasing reinsertion factors $j_n$ (o) from 0.2 to 0.4 are used for the EVM part.

Yet another exemplary embodiment using 8 stages, and an OSR of 1 reaches the following:
  To achieve 6.8 dB PAR, the following parameters are used:
  a clipping threshold T of 6.57 dB relative the average power in the non-reserved frequencies;
  a 5% reserved frequencies or tones (with a random distribution) for the TR part;
  a 7.5% power overhead in the reserved tones;
  a 0% EVM in the non-reserved tones.

In this example, exponentially decreasing reinsertion factors $k_n$ from 34 to 16 are used for the TR part.

Figure 3C:
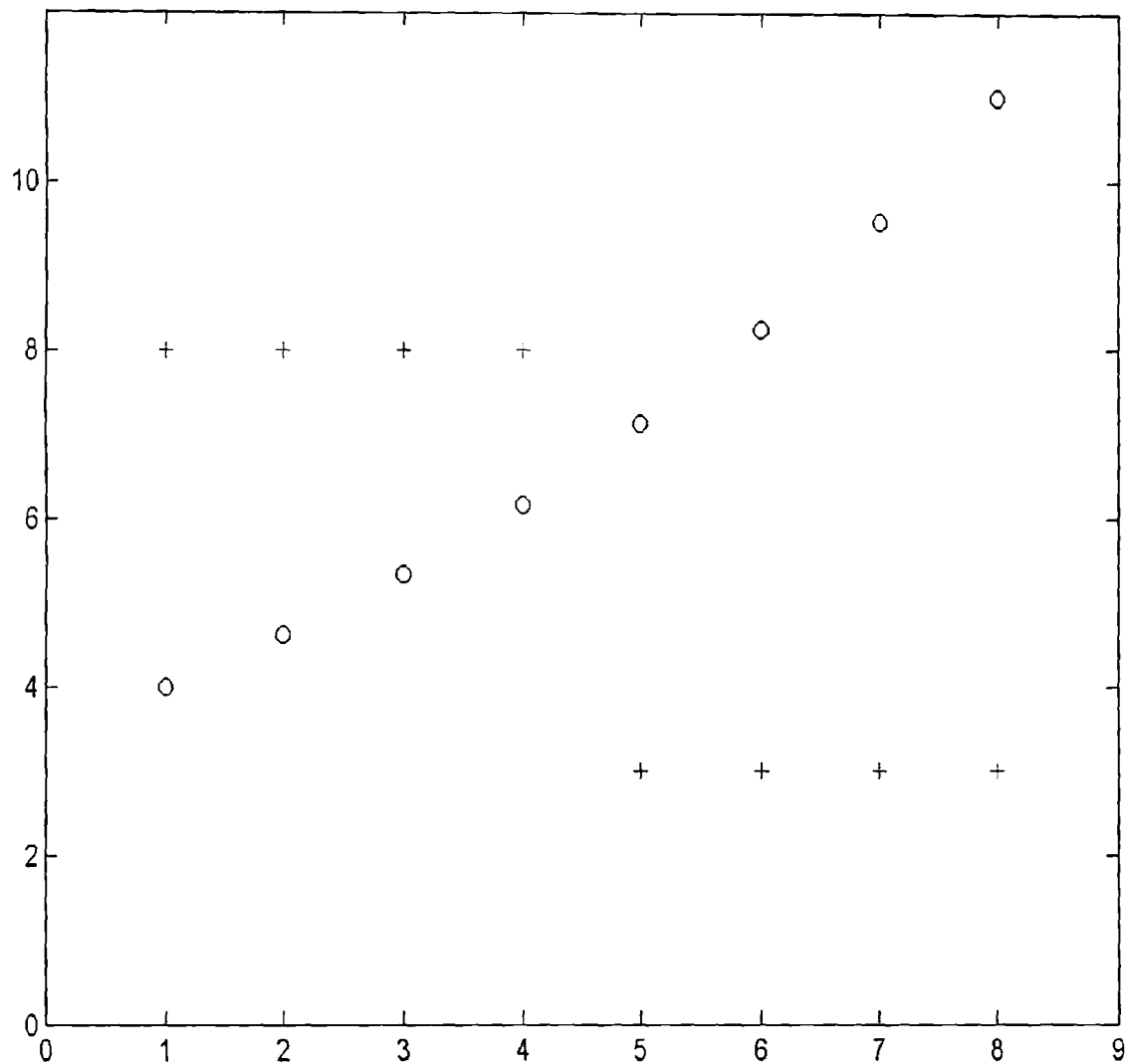
FIG. 3c is another diagram illustrating the reinsertion factors in each stage of an apparatus having 8 stages used to reduce peak power according to an exemplary embodiment of the present invention.

FIG. 3c illustrates another exemplary embodiment showing a non-exponential decreasing distribution of reinsertion factors for the TR part that accomplishes almost the same performance as the one described earlier and which was illustrated in FIG. 3b. The parameters used in this example are:
  a clipping threshold T of 3.85 dB relative the average power in the non-reserved frequencies;
  a 5% reserved frequencies or tones (with a random distribution) for the TR part;
  a 5% power overhead in the reserved tones;
  a 13% EVM in the non-reserved tones.

As can be seen from FIG. 3c only 2 reinsertions factors $k_n$ (+) for the TR part are considered, which are 8 and 3 respectively. The distribution of the reinsertion factors $j_n$ (o) is similar to the one illustrated in FIG. 3b.

As described earlier, the frequency mask or filter 10 of each stage consists of the reinsertion factor for the TR part at the frequency locations of the reserved tones, and the reinsertion factor for the EVM part (if any) at the frequency locations of the non-reserved tones.

Figure 4:
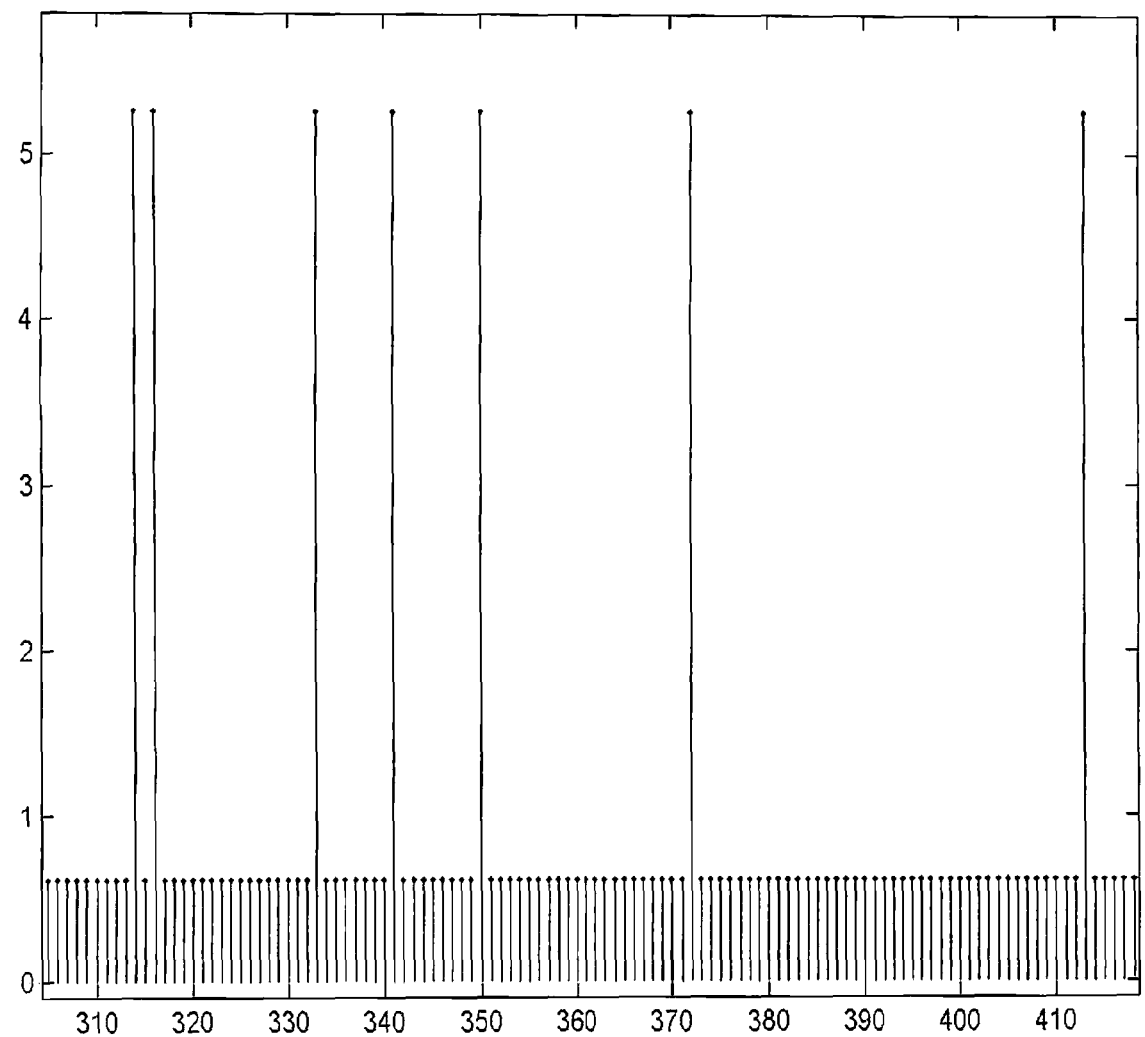
FIG. 4 is a diagram illustrating a portion of the frequency mask or filter consisting of reinsertion factors in a stage of an apparatus having 8 stages used to reduce peak power according to an exemplary embodiment of the present invention.

Using FIG. 3b, a portion of the frequency mask or filter 50 at stage number 4 can be derived and is illustrated in FIG. 4. As can be seen from FIG. 3b and FIG. 4, the reinsertion factor for the TR part is $k_n$=5.3 whereas for the EVM part, the reinsertion factor is $j_n$=0.63 (magnified by 10 in FIG. 3b).

As mentioned earlier, and in accordance with embodiments of the present invention, the subset of reserved frequencies/frequency is chosen prior to transmission to avoid transmitting any side information to a receiver. In this case, no special receiver operation is needed.

In alternate embodiments, the subset of reserved frequencies/frequency may be reselected during communication depending on the quality of the channel or for any other reason. In this case, the receiver is informed on or originates the reserved frequencies/frequency.

Furthermore and in accordance with embodiments of the present invention, the reserved frequencies/frequency typically do/does not carry any useful information. Instead, the non-reserved frequencies/frequency are/is allowed to carry useful information. In alternate embodiments, the reserved frequencies/frequency may include some type of information. In those embodiments, the reserved frequencies/frequency are/is also decoded by the receiver.

Figure 5A:
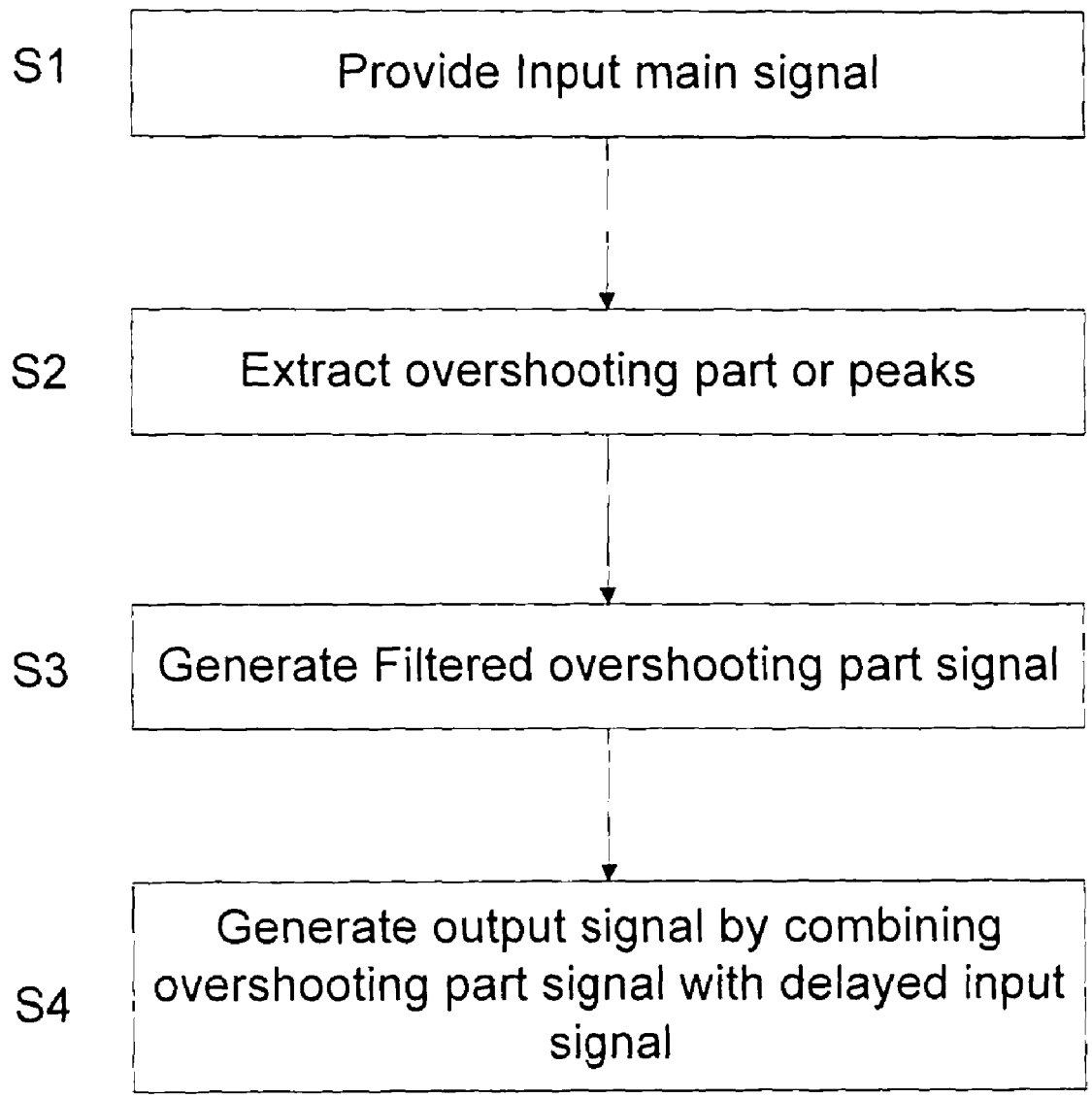
FIG. 5a is a flowchart of a method according to the present invention.

FIG. 5a illustrates a flowchart of a method for reducing peak power in a transmitter for use in telecommunications, comprising at least two subsequent interconnected stages according to a second aspect of the invention.

At step S1, a main signal is provided as input to one stage. The input main signal is a multi-carrier signal or a single carrier signal. Further, the input main signal is originally in a frequency domain or in a time domain, At step S2, an overshooting part or peaks of the input main signal is extracted based on a predetermined clipping level, At step S3, a filtered overshooting part signal is passed through a filter or frequency mask having a frequency response, wherein the frequency response on at least one reserved frequency of at least one stage is smaller than the frequency response on said at least one reserved frequency of a previous stage, At step S4, an output main signal is generated by combining the filtered overshooting part signal with delayed version of the input main signal.

Figure 5B:
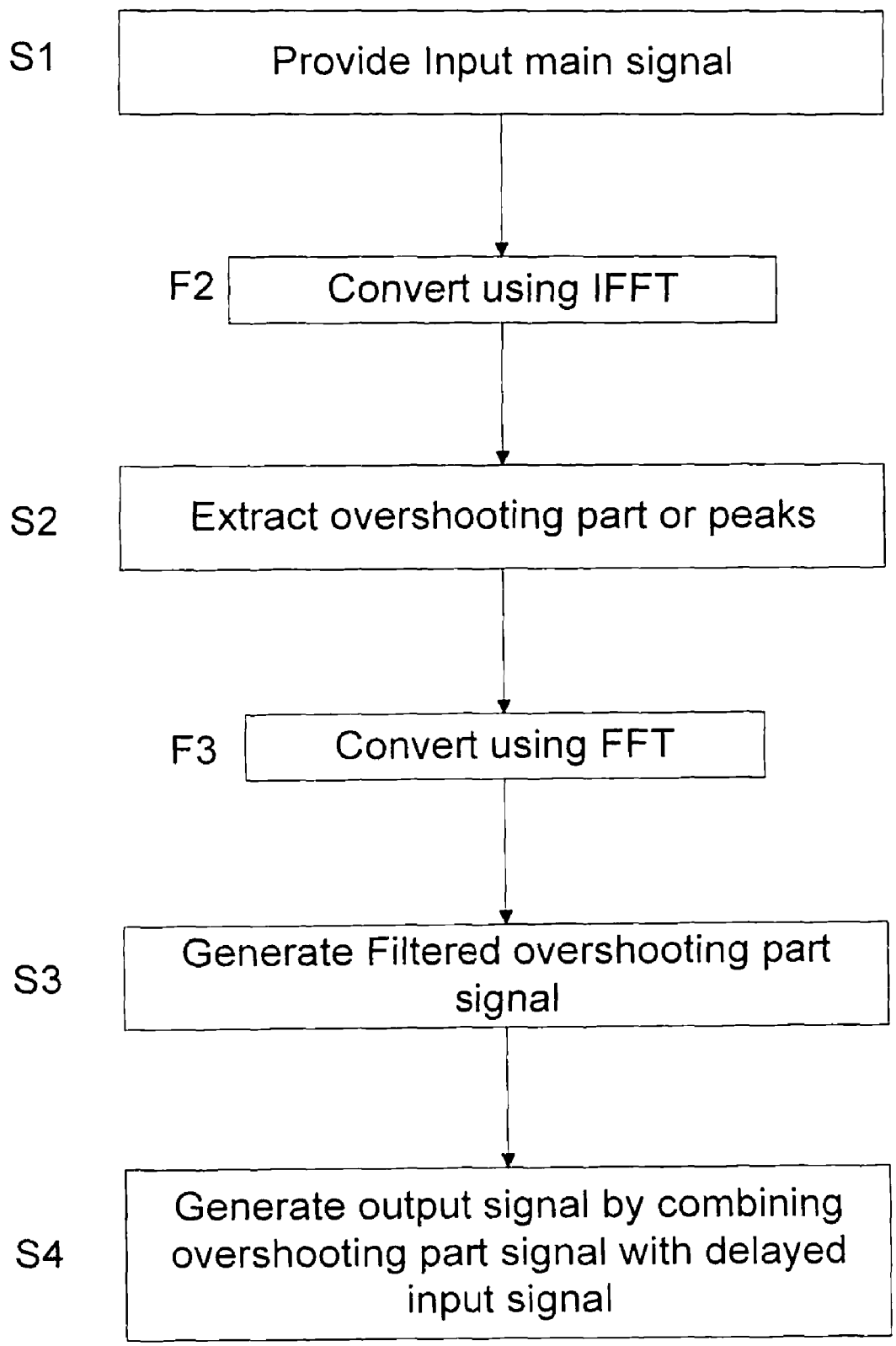
FIG. 5b is another flowchart of a method according to the present invention.

FIG. 5b also illustrates a flowchart of a method for reducing peak power in a transmitter for use in telecommunications, comprising at least two subsequent interconnected stages according to a second aspect of the invention. In this case however, the input main signal is considered to be originally in a frequency domain. Similarly to FIG. 5a, at step S1, a main signal is provided as input to one stage. Subsequently, the input main signal is provided at step F2 to an Inverse Fast Fourier Transformer, wherein the Inverse Fast Fourier Transformer is configured to convert the input main signal into time domain.

At step S2, an overshooting part or peaks of the input main signal is extracted based on a predetermined clipping level.

Furthermore, the filtered overshooting part signal generated at step S2 are first passed through a Fast Fourier Transformer at step F3 prior to generate at step S3 a filtered overshooting part signal using the filter or frequency mask having a frequency response, wherein the frequency response on at least one reserved frequency of one stage is smaller than the frequency response on said at least one reserved frequency a previous stage.

Then, the filtered overshooting part or peaks signal is combined at step S4 with a delayed version of the input main signal in order to generate an output main signal from one single stage.

Figure 6:
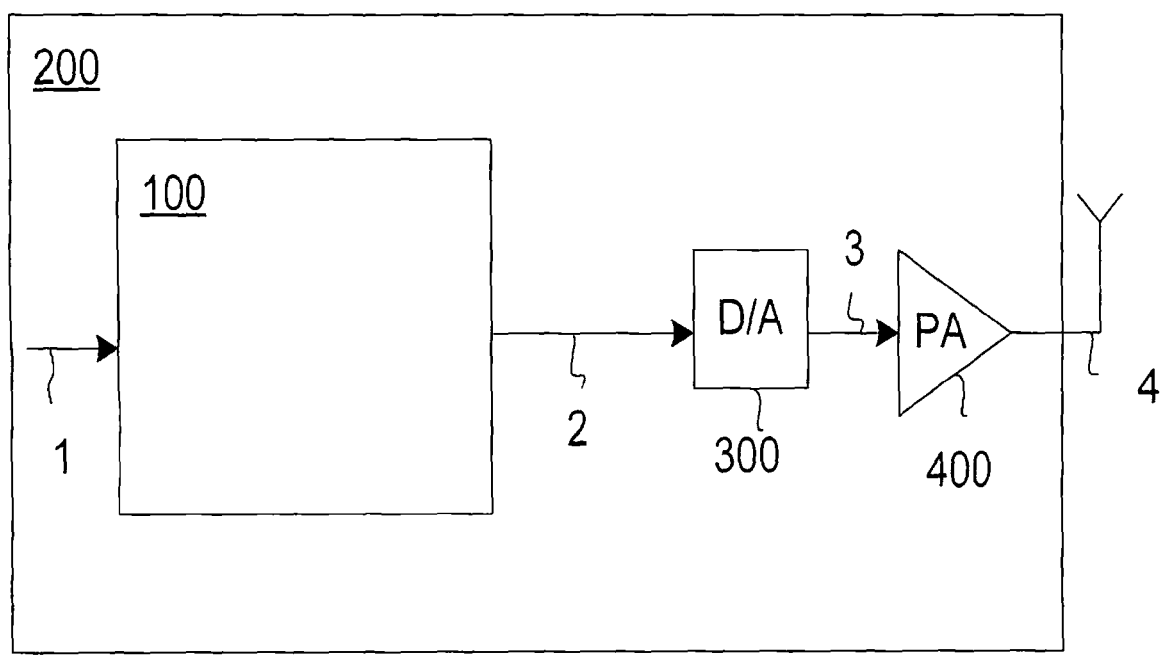
FIG. 6 is a block diagram of an exemplary embodiment of a base station including an apparatus according to the present invention.

The apparatus 100 for reducing peak power in a transmitter can in accordance with the present invention be implemented in a number of different ways. FIG. 6 illustrates a schematic block diagram of a third aspect of the present invention wherein an exemplary embodiment of a base station 200 includes the apparatus 100 according to the present invention. In FIG. 6, elements that are not necessary for understanding the present invention have been omitted, such as for instance modulators, encoders, up-converters, filters and other base station components. According to FIG. 6, an input main signal 1 is forwarded to an apparatus 100 according to the present invention. The output signal 2 from apparatus 100 is further converted into a time continuous signal 3 by passing it through a digital to analogue converter (D/A) 300. The time continuous signal 3 is subsequently amplified using a power amplifier (PA) 400 and the output from the PA is fed into an antenna prior to transmission.

A person skilled in the art appreciates that the present invention can be realised in many ways. The apparatus can be realised in hardware with means of digital circuits or as software in a signal processing circuit. Furthermore, the filters described in the present invention can be implemented using FIR (Finite Impulse Response) filters, IIR (Infinite Impulse Response) filters, or a combination of FIR and IIR filter structures. Thus, the most general filter structure in which the invention may be implemented could be used.

While the invention has been described in terms several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention

The invention claimed is:

1. An apparatus for reducing peak power in a transmitter for use in telecommunications systems, the apparatus comprising:
a number (n) of subsequent interconnected stages, where n is greater than or equal to two and where each stage of the n stages includes:
an input node that receives an input main signal,
an output node that receives an output main signal,
wherein the input main signal of one of the interconnected states is received from the output main signal of a previous one of the interconnected stages,
an extractor that extracts peaks of the input main signal based on a predetermined clipping level,
a filter that includes an amplitude response and generates a filtered peak signal, where the amplitude response on at least one reserved frequency of at least one of the n stages is smaller than the amplitude response on the at least one reserved frequency of a previous one of the n stages, and
a combiner that generates the output main signal by subtracting the filtered peak signal from a delayed version of the input main signal.

2. The apparatus according to claim 1, further comprising:
a fractional delay filter provided in-between the n stages and configured to generate an output signal as a fractional sample delayed version of the output main signal, and
where the output signal comprises the input main signal of a subsequent one of the n stages.

3. The apparatus according to claim 1, where the filter provides the amplitude response on at least one non-reserved frequency of at least one of the n stages that is larger than the amplitude response on the at least one non-reserved frequency of a previous one of the n stages.

4. The apparatus according to claim 1, where:
the filter applies a first reinsertion factor ($k_1 \ldots k_n$) on the output signal from the extractor on the at least one reserved frequency,
a reinsertion factor ($k_2 \ldots k_n$) of at least one of the n stages is smaller than a reinsertion factor ($k_1 \ldots k_{n-1}$) of a previous one of the n stages, and
the amplitude response on the at least one reserved frequency of the filter is represented by the first reinsertion factor ($k_1 \ldots k_n$).

5. The apparatus according to claim 4, where:
the filter applies a second reinsertion factor ($j_1 \ldots j_n$) on the output signal from the extractor on the at least one non-reserved frequency,
a reinsertion factor ($j_2 \ldots j_n$) of at least one of the n stages is larger than a reinsertion factor ($j_1 \ldots j_{n-1}$) of a previous one of the n stages, and
the amplitude response on the at least one non-reserved frequency of the filter is represented by the second reinsertion factor ($j_1 \ldots j_n$).

6. The apparatus according to claim 5, where:
the first reinsertion factor ($k_1 \ldots k_n$) exhibits a substantially decreasing trend over the n stages, and
the second reinsertion factor ($j_1 \ldots j_n$) exhibits a substantially increasing trend over the n stages.

7. The apparatus according to claim 5, where the first reinsertion factor ($k_1 \ldots k_n$) one of decreases exponentially or decreases linearly with the n stages.

8. The apparatus according to claim 5, where the second reinsertion factor ($j_1 \ldots j_n$) one of increases exponentially or increases linearly with n stages.

9. The apparatus according to claim 1, where the extractor extracts the peaks of the input main signal that exceed the predetermined clipping level.

10. The apparatus according to claim 1, where the input main signal comprises a single carrier signal to be transmitted through a communication channel that includes pronounced zero positions in which the at least one reserved frequency is capable of being allocated.

11. The apparatus according to claim 1, wherein:
the apparatus comprises at least a first, second, and third of the stages that are connected in order;
the second stage has a smaller amplitude response on the at least one reserved frequency than the first stage; and
the third stage has a smaller amplitude response on the at least one reserved frequency than the second stage.

12. The apparatus according to claim 11, wherein:
the second stage has a larger amplitude response on at least one non-reserved frequency than the first stage; and
the third stage has a larger amplitude response on the at least one non-reserved frequency than the second stage.

13. A method for reducing peak power in a transmitter for use in telecommunications systems that includes a number (n) of subsequent stages, where n is greater than or equal to two, and where for each stage of the n stages, the method comprises:

provide an input main signal;

extracting peaks of the input main signal that exceed a predetermined clipping level;

generating a filtered peak signal, via a filter that includes a amplitude response, where the amplitude response on at least one reserved frequency of at least one of the n stages is smaller than a amplitude response on the at least one reserved frequency of a previous one of the n stages; and generating an output main signal from one of the n stages, via a combiner, by subtracting the filtered peak signal from a delayed version of the input main signal;

wherein the output main signal of one of the interconnected states is provided as the input main signal of a subsequent one of the interconnected stages.

14. The method according to claim 13, further comprising:

generating an output signal as a fractional sample delayed version of the output main signal, and where the output signal comprises the input main signal of a subsequent one of the n stages.

15. The method according to claim 13, where generating a filtered peak signal comprises:

providing the frequency response on at least one non-reserved frequency of at least one of the n stages that is larger than a frequency response on the at least one non-reserved frequency of a previous one of the n stages.

16. The method according to claim 13, where generating the filtered peak signal comprises:

applying a first reinsertion factor ($k_1 \ldots k_n$) on the output signal of the extractor on at least one reserved frequency, where a reinsertion factor ($k_2 \ldots k_n$) of at least one of the n stages is smaller than a reinsertion factor ($k_1 \ldots k_{n-1}$) of a previous one of the n stages.

17. The method according to claim 16, where generating the filtered peak signal comprises:

applying a second reinsertion factor ($j_1 \ldots j_n$) on the output signal from the extractor on at least one non-reserved frequency, where a reinsertion factor ($j_2 \ldots j_n$) of at least one of the n stages is larger than a reinsertion factor ($j_1 \ldots j_{n-1}$) of a previous one of the n stages.

18. The method according to claim 17, where:

the first reinsertion factor ($k_1 \ldots k_n$) exhibits a substantially decreasing trend over the n stages, and the second reinsertion factor ($j_1 \ldots j_n$) exhibits a substantially increasing trend over the n stages.

19. The method according to claim 17, where the first reinsertion factor ($k_1 \ldots k_n$) one of decreases exponentially or decreases linearly with the n stages.

20. The method according to claim 17, where the second reinsertion factor ($j_1 \ldots j_n$) one of increases exponentially or increases linearly with the n stages.

21. The method according to claim 13, where extracting peaks comprises:

extracting peaks of the input main signal that exceed the predetermined clipping level.

22. The method according to claim 13, further comprising:

providing at least a first, second, and third of the stages that are connected in order, wherein the second stage has a smaller amplitude response on the at least one reserved frequency than the first stage, and wherein the third stage has a smaller amplitude response on the at least one reserved frequency than the second stage.

23. The method according to claim 22, wherein:

the second stage has a larger amplitude response on at least one non-reserved frequency than the first stage, and the third stage has a larger amplitude response on the at least one non-reserved frequency than the second stage.

24. A base station of a telecommunications system, the base station comprising:

a number (n) of subsequent interconnected stages, where n is greater than or equal to two and where each stage of the n stages includes:

an input node that receives an input main signal, an output node that receives an output main signal, wherein the input main signal of one of the interconnected states is received from the output main signal of a previous one of the interconnected stages, an extractor that extracts peaks of the input main signal based on a predetermined clipping level, a filter that includes an amplitude response and generates a filtered peak signal, where the amplitude response on at least one reserved frequency of at least one of the n stages is smaller than the amplitude response on the at least one reserved frequency of a previous one of the n stages, and a combiner that generates the output main signal by subtracting the filtered peak signal from a delayed version of the input main signal.

* * * * *